July 29, 1924.
J. H. VEASEY
CLAMP
Filed June 16, 1923
1,502,890
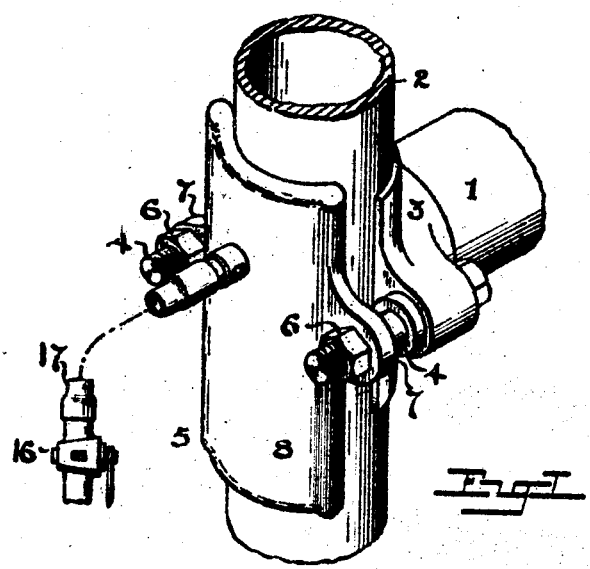
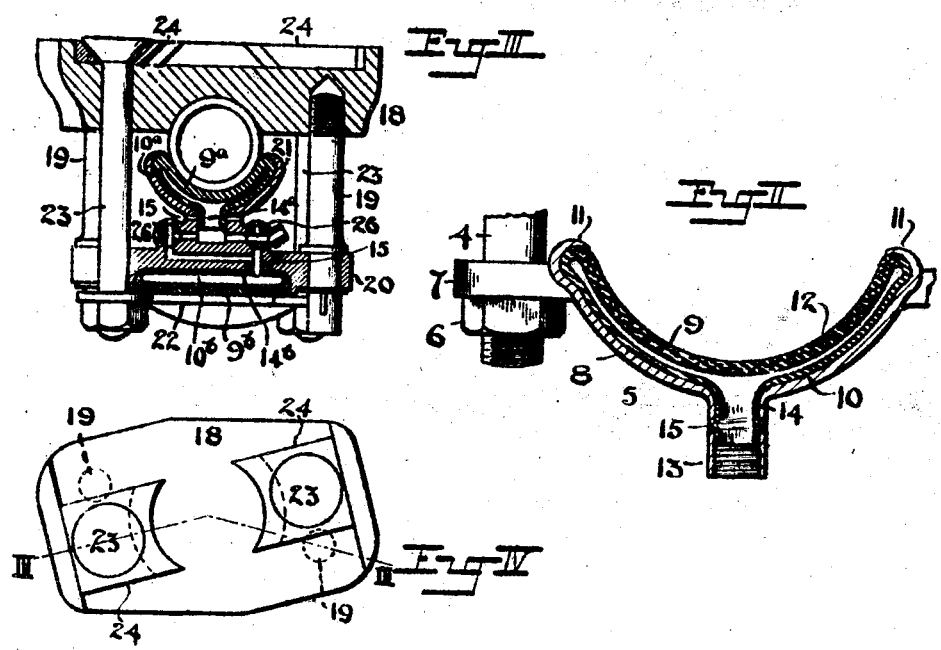
John Herbert Veasey
INVENTOR Patented July 29, 1924.

1,502,890

UNITED STATES PATENT OFFICE.

JOHN HERBERT VEASEY, OF JOHANNESBURG, TRANSVAAL, SOUTH AFRICA.

CLAMP.

Application filed June 16, 1923. Serial No. 645,799½.

*To all whom it may concern:*

Be it known that JOHN HERBERT VEASEY, a British subject, residing at 44 Anstey's Buildings, Kerk Steet, Johannesburg, Transvaal Province, Union of South Africa, has invented new and useful Improvements in Clamps, of which the following is a specification.

The present invention has reference to clamps of the kind in which fluid pressure acts through a flexible diaphragm. In clamps of this kind, as hitherto made, there has been a difficulty in making a satisfactory joint between the edge of the diaphragm and its supporting casing, whilst avoiding an inconveniently large border of the device which is inactive. In other words the total area of such a clamp has been excessive in relation to the active area thereof.

According to this invention, a fluid tight joint between the diaphragm and the casing is avoided by making the diaphragm in the form of a bag within which the pressure fluid is admitted.

The invention is illustrated in the accompanying drawing in which Fig. I shows the clamp arranged for securing an arm to a column.

Fig. II is an enlarged horizontal cross section of half the clamp.

Fig. III is a view of another form of clamp sectioned on III, III, Fig. IV.

Fig. IV is a plan thereof.

Referring to Figs. I and II, 1 indicates an arm clamped to a column 2. For this purpose it has formed on it a half clamp section 3. From said clamp section there project bolts 4 supporting the other clamp section 5. The latter is free to slide on the bolts 4 and is roughly adjusted to the column by nuts 6 on the bolts 4 engaging ears 7 on the clamp section 5.

Said clamp section 5 includes a casing 8 for the diaphragm 9. The latter consists of the face of a rubber bag 10 of appropriate shape to fit within the casing and present the diaphragm 9 to act on the column 2.

The edges 11 of the casing 8 are turned over to support the bag closely to its area of contact with the column and so leave only a negligible part of the diaphragm unsupported. In order to strengthen the diaphragm against rupture it is preferred to reinforce it with flexible fabric or the like 12 similarly to a pneumatic tyre.

The casing is provided with a hollow stem 13 and a thin flexible tube 14 projects from the bag and fits into said stem. Holes 15 in the stem maintain atmospheric pressure between the tube and the stem with the result that when pressure fluid is admitted to the bag, the tube is forced by the pressure within it into close contact with the stem and makes a tight joint therewith.

The admission and exhaust of pressure fluid is controlled by a two-way cock 16 which is shown connected to the stem 13 by a flexible hose 17 so that it may be brought within easy reach of the operator.

In operation the clamp parts are placed in the desired position on the columns and the clamp sections are adjusted approximately into contact with the column by the nuts 6. The cock 16 is then turned to admit pressure fluid within the bag; and said fluid, acting as it does over practically the whole area of the clamp, is advantageously applied for exerting a strong clamping pressure on the column. By turning the cock to exhaust the bag, the clamping pressure is at once released and the arm 1 may then be shifted on the column 2.

The device shown in Figs. III and IV is for securing the saddle 18 to the arm 1 and for securing the foot of a rock drill cradle to the saddle 18. From the saddle there project studs 19 rigidly securing a head 20 on the other side of the arm 1. Rigid with said head 20 is a half clamp section 21 similar to the plate 8 and fitted with a rubber bag $10^a$, having a diaphragm surface $9^a$ which makes contact with the arm 1.

On the lower side of the head 20 is a recess for holding another bag $10^b$, the diaphragm $9^b$ of which exerts its pressure on the cross-head 22. The pressure exerted on said cross-head is transmitted by bolts 23 to clips 24 on the upper side of the head; said clips 24 being adapted to engage the conical foot of a rock drill cradle.

The bags $9^a$, $9^b$ are provided with tubes $14^a$, $14^b$, fitting in sockets formed with holes 15 for maintaining atmospheric pressure outside the tubes.

Pressure fluid is admitted to or exhausted from the bags $9^a$, $9^b$ simultaneously or separately by the cocks 26.

I claim:

1. The combination of two members relatively movable for clamping, pressure exerting means consisting of a flexible bag, said members enclosing the bag and supporting it over substantially its whole area, the clamping movement of the members being insufficient substantially to lessen the support afforded by them to the bag, and means for admitting pressure fluid to and exhausting it from said bag.

2. The combination of two members relatively movable for clamping, means for adjusting said members to substantially their clamping position so that the clamping movement is small, means for exerting the clamping pressure consisting of a flexible bag, enclosed and supported over substantially its whole area by said members while it is exerting clamping pressure, and means for admitting pressure fluid to and exhausting it from the bag.

3. In a fluid actuated clamp, a flexible bag having a face to make contact with a part to which the clamp is attached, a clamp member recessed to receive the bag, and, with the said part, to support the bag substantially over its whole area.

4. In a fluid actuated clamp, a flexible bag to the interior of which pressure fluid is admitted to cause it to operate as a pressure exerting element, a tubular connection to said bag, a tubular seating in which said connection engages and means to maintain atmospheric pressure between the connection and the seating.

In testimony whereof I have signed my name to this specification.

JOHN HERBERT VEASEY.